United States Patent [19]

DeHart

[11] 4,117,953
[45] Oct. 3, 1978

[54] SEED PLANTING DEVICE

[76] Inventor: Harold Fredrick DeHart, Rte. 5, Box 190E, Durham, N.C. 27704

[21] Appl. No.: 723,545

[22] Filed: Sep. 15, 1976

Related U.S. Application Data

[63] Continuation-in-part of Ser. No. 573,412, May 1, 1975, Pat. No. 3,986,638.

[51] Int. Cl.² .............................................. B65H 3/08
[52] U.S. Cl. ................................. 221/211; 221/150 A
[58] Field of Search ................. 221/150 A, 211, 278; 222/504; 111/1; 137/625.25, 625.27; 141/67; 214/1 BT, 309

[56] References Cited

U.S. PATENT DOCUMENTS

| | | | |
|---|---|---|---|
| 2,546,838 | 3/1951 | Tasche | 221/211 X |
| 2,665,013 | 1/1954 | Socke | 214/1 BT X |
| 2,849,847 | 9/1958 | Anderson | 221/211 X |
| 2,895,652 | 7/1959 | Rockriver | 222/504 X |
| 3,077,207 | 2/1963 | Koutnik | 137/625.25 |
| 3,610,284 | 10/1971 | Spencer | 137/625.27 X |
| 3,738,530 | 6/1973 | Fine et al. | 221/211 |
| 3,990,466 | 11/1976 | Sanders | 137/625.27 X |

Primary Examiner—Robert B. Reeves
Assistant Examiner—Fred A. Silverberg
Attorney, Agent, or Firm—B.B. Olive

[57] ABSTRACT

Various types of seeds are planted in a coordinate array in flats or in peat cups by means of a hand-manipulated seed pick-up head having limited paths of rectilinear and vertical movement. The pick-up head holds the seeds on a frontal face thereof in the operator's view and transfers them to a plurality of individually adjustable tubes which serve to guide the seeds upon release of the vacuum into the peat cups by gravity feed. An instantaneous puff of air may be applied to aid in expelling the seeds into the tubes.

2 Claims, 5 Drawing Figures

SEED PLANTING DEVICE

CROSS-REFERENCE TO RELATED APPLICATION

This application is a continuation-in-part of copending application, Ser. No. 573,412, filed May 1, 1975, entitled "Seed Planter", now U.S. Pat. No. 3,986,638, the teachings of which are incorporated herein by reference.

BACKGROUND OF THE INVENTION

This invention relates to automatic and semi-automatic seeders. More specifically, the invention relates to a seeder for use in the bedding plant industry which will reliably pick up seeds from a seed tray and deposit them in a predetermined array into a flat or into peat cups.

The problem of getting millions of seedlings planted in a short period of time has forced the horticultural nursery industry into mechanizing this operation. Horticulturists have recognized that direct seeding by machine can greatly cut labor costs in the initial planting of the seeds. By initially planting the seeds in individual peat cups, the step of transplanting the plants from flats to peat cups is eliminated. Thus, there is no setback in growth due to transplanting, and the plants are not contaminated by the handling associated with transplanting.

U.S. Pat. No. 2,546,838 to Carl H. Tasche describes a seeder with a suction header which has a coordinate array of downwardly projecting suction tubes. Upon producing a suction in the header, the tubes pick up seeds from a seed tray. The header is then slidably moved on a horizontal track to a position over a flat where the suction is cut off and the tubes deposit the seeds in a coordinate array. U.S. Pat. No. 2,445,701 describes a seed counting machine using a similar principle.

Jiffy Products of America of West Chicago, Illinois, sells a Fricke-Jiffy Seeder which is designed to pick up and distribute through an arrangement of tubes of maximum of 96 seeds into a large flat. The Fricke-Jiffy Seeder is described in an article in the September 1970 issue of *Grower Talks* magazine published by Geo. J. Ball, Inc., of West Chicago, Illinois 60185.

The previously described prior art devices incorporate hollow suction tubes which point downward and are mechanically lowered into the seed tray to pick up seeds. It has been found that in normal operation, a certain percentage, around 10 percent, of the tubes will not pick up a seed in a given cycle. The operator has no way to visually inspect the ends of the tubes to determine whether each tube has picked up a seed. Furthermore, when the seed tray empties to less than one-half full, the seeds in the tray tend to pack into a hard layer and thus become much harder to pick up. Periodic refilling and stirring of the seeds is necessary to alleviate this problem. This packing phenomenon occurs most noticeably with "fuzzy" tomato seeds.

Thus, in this era of increasing labor cost, there is an acute need for an improved semi-automatic seeder for the small to medium sized nursery which allows essentially 100 percent pick up of seeds and which allows the operator to view each suction hole to assure that a seed has been picked up by each hole. Also, the seeder should be operable with a low level of seeds in the seed tray to prevent the unnecessary waste of unused seeds.

The prior art practice was improved upon and the previously mentioned objectives were accomplished by the subject matter of copending application, Ser. No. 573,412, which provides a seeding apparatus for transferring seeds from a seed supply to a flat or individual peat cups. This seeding apparatus incorporates a hand-manipulated seed pick-up head and a seed tray which holds the supply of seeds to be planted. The seed tray has a substantially flat bottom and interconnecting sides and is adapted to hold a predetermined supply of seeds. A vacuum source is connected to the pick-up head for providing a suction force through a horizontal line of equally-spaced apertures on the frontal face of the pick-up head. The apertures are smaller than the seeds so that the seeds are held in place over the apertures. These apertures are readily visible by the operator at all times so that he may check on the efficiency of operation, i.e., he can see which apertures have seeds and which do not. A manifold positioned adjacent to the seed tray of this apparatus provides a plurality of horizontally aligned and spaced openings along an upper surface. These openings are positioned and spaced so as to mate with the apertures on the face of the head so as to receive the seeds when released. An array of plastic tubes communicate with the openings and extend downwardly to deposit the seeds. A disadvantage of this apparatus is that the seeds sometimes stick to the frontal face of the pickup head when the vacuum is released. In this regard, it becomes an object of the present invention to provide means for assuring that all of the seeds secured to the frontal face are released when desired. Other objects, including a simpler means for positioning the tubes over the peat cups, will become apparent from the specification. Also, an improved valve is provided.

While applicant's copending application apparatus provides a much needed and greatly improved seeding apparatus, it becomes an object of the present invention to improve upon such apparatus while maintaining its many advantages.

SUMMARY OF THE INVENTION

A seeding apparatus for transferring seeds from a seed supply to a flat or individual peat cups incorporates a support frame mounted on legs which are adapted to reside upon a worktable or other suitable surface. The frame mounts a seed tray having a substantially flat base and a manifold utilized in transferring the seeds. The frame also mounts a hand-manipulated seed pick-up head which is placed on rollers for rectilinear movement and which has a limited vertical range of motion for moving from the seed tray to the manifold levels. A vacuum source is connected to the pick-up head for providing a suction force through a line of equally-spaced apertures on a frontal face of the pick-up head. Each aperture is centered on a convex raised area on the frontal face surface. The apertures are smaller than the seeds so that the seeds are held in place on the convex surface over the apertures. The convex surface aids in making the seed covered apertures visible to the operator at all times and aids in preventing the seeds from sticking to apertures. A flexible hose is used as the vacuum line. A second line is connected to the pick-up head for providing a flow of pressurized air to the apertures when it is desired to release the seeds from the apertures.

A novel valve arrangement within the pick-up head allows for positive, negative or neutral pressure conditions at the apertures. The valve includes a resilient ball member attached to a valve stem and which may be moved from a normally open position to a seated or closed position. When in the closed position, a number of openings connected to the exhaust port of the vacuum are uncovered so that a positive pressure may be applied to the seed pick-up apertures.

A manifold positioned adjacent to the seed tray has a plurality of horizontally aligned and spaced openings along an upper surface which mate with the apertures on the face of the pick-up head so as to receive the seeds when released. An array of plastic tubes communicate with the openings and extend from beneath the manifold with the lower ends of the tubes being received by adjustable guides positioned above the peat cups.

Once the vacuum is applied to the pick-up head, the head is lowered by the operator and is manually rolled along the provided track so that the pick-up head is drawn through the seed supply tray and each aperture picks up a desired number of seeds, all of which are in the view of the operator. After picking up the seeds, the head is manually rolled along the track in a slightly raised position to a point where the head is positioned on the manifold so that the apertures align with the openings in the manifold. Upon cutoff of the vacuum supply the seeds are free to drop from the face of the seed pick-up head so as to fall by gravity through the manifold openings and tubes and into the peat cups. Should the seed fail to drop when the vacuum is released, a pressurized air supply line may be used to supply a puff of air to the apertures thereby forcing the seeds free. The process is then repeated by manually rolling the raised pick-up head back to a position over the supply tray and repeating the operation. The seeds in the supply tray are always maintained loose due to the back and forth motion applied to the seed pick-up head by the operator. The operator can assure an efficient operation since he always has view of the apertures in the pick-up head face.

DESCRIPTION OF THE PREFERRED EMBODIMENT

Figure 1:
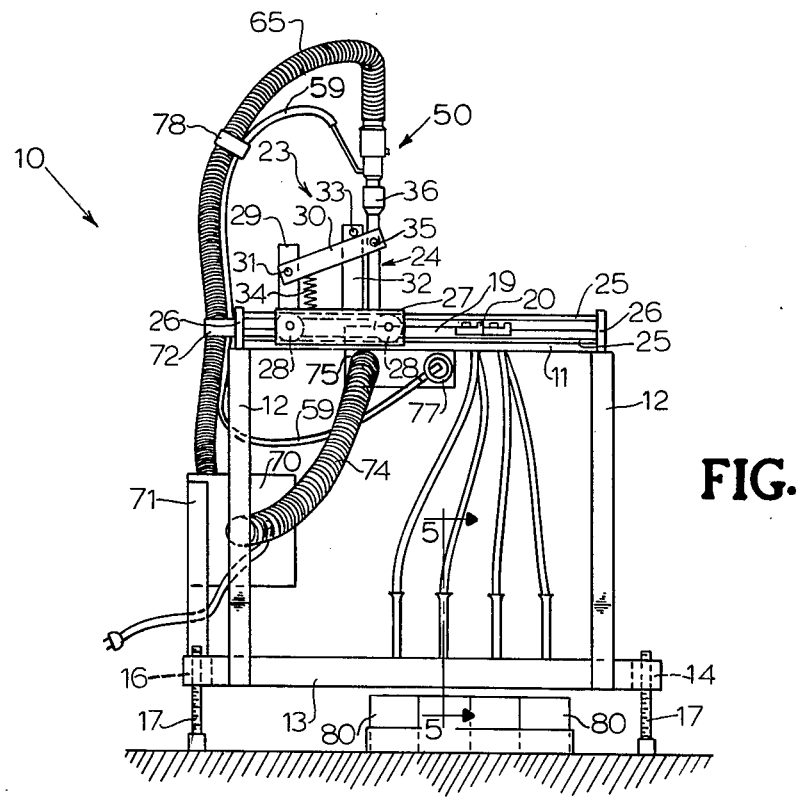
FIG. 1 is a side elevation view of the seed planter of the present invention with the pick-up head in a raised position prior to it being moved forward into the seed supply tray.
Figure 2:
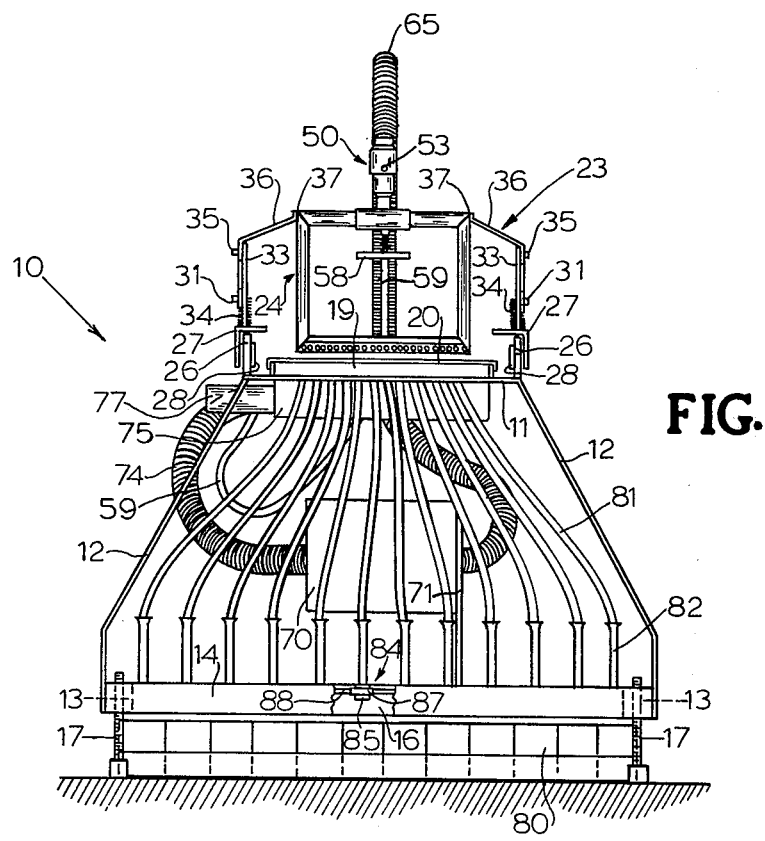
FIG. 2 is a front elevation view of the seed planter shown in FIG. 1.

Referring to the drawings and particularly to FIGS. 1 and 2, the seed planter 10 of the present invention comprises an upper support frame having top members 11 and vertical support members 12 and a bottom support frame which includes sides 13, front wall 14 and back wall 16. Support members 12 are made integral with sidewalls 13. Four adjustable legs 17 are secured to front and back walls 14, 16 for supporting the planter on a table top, or the like.

A seed supply tray 19 and two manifold blocks 20 are mounted in a fixed position on top members 11 by bolts or any other suitable means. Seed tray 19 has a substantially flat bottom and interconnecting sides. Each manifold 20 has a flat top wall surface and an upright wall extending from the flat surface and formed with a plurality of curved recessed cavities. A plurality of holes aligned with the cavities extend downwardly through each manifold 20. These cavities and holes are positioned, as seen from later description, to align with the apertures on the pick-up head from which the seeds are deposited. A detailed description of a form of manifold construction is found in copending application Ser. No. 573,412 and will not be repeated since it suits the invention.

A pick-up head carriage 23 is mounted on top members 11 by means of four rollers 28 which move between track or rail members 25. Carriage 23 includes a pair of angle members 27 on which the rollers 28 are mounted. A pair of vertical support members 29 extend from angle members 27 and each is pivotally secured to an arm member 30 by a pivot pin 31. Arm members 30 are also pivotally secured to a pair of support brackets 36 by pivot pins 35. Support brackets 36 are, in turn, fixedly secured to the pick-up head by welds or the like at 37 (see FIGS. 2 and 3). A pair of springs 34 provide an upward bias on arms 30. Thus, pick-up head 24 may be vertically moved about fixed pivot pins 31 during operation. A pair of stop bosses 33 provide an upper limitation on the movement of pick-up head 24 and a lower limitation on such movement is provided by the base of the seed tray 19.

Figure 3:
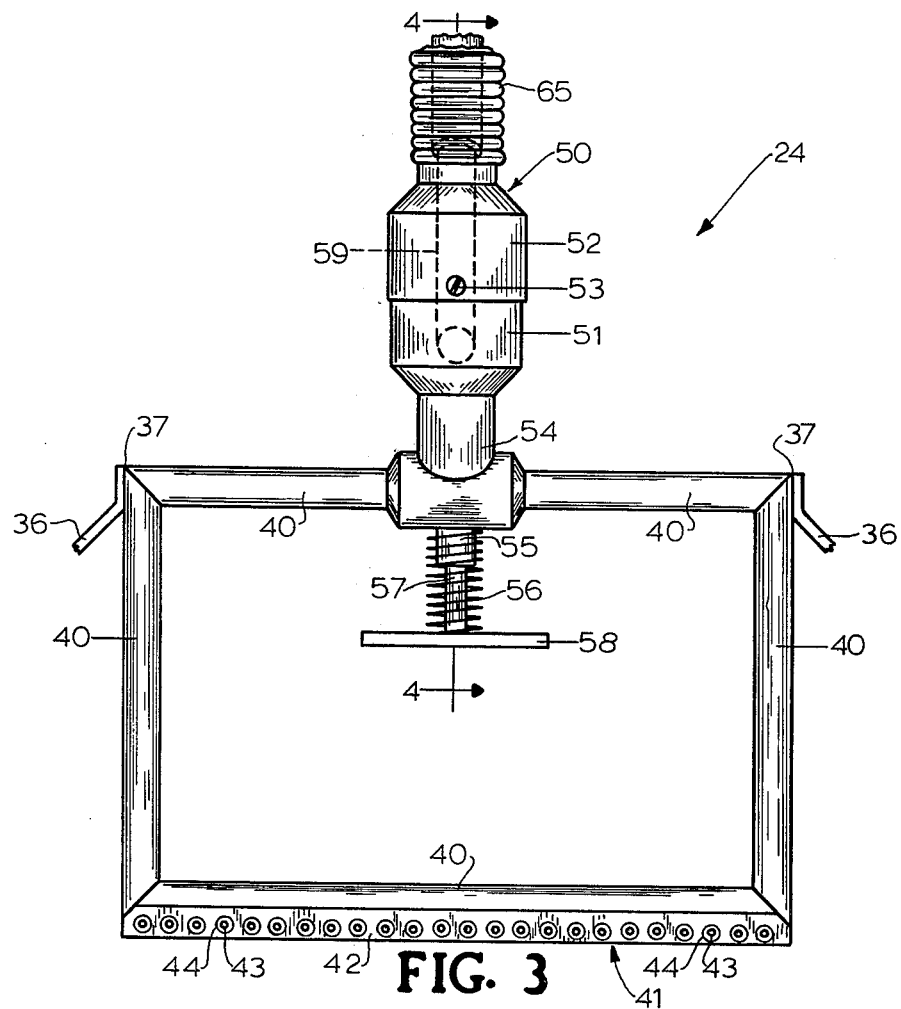
FIG. 3 is an enlarged front elevation view of the pick-up head employed in the present invention.

Referring to FIG. 3, seed pick-up head 24 includes tubular members 40 which provide an air passage. The seed receiving member 41 is made from tubing similar to members 40 but with its face area 42 providing a flattened surface which includes a plurality of equally-spaced apertures 43. Apertures 43 are centered on convex raised surfaces 44 which form a part of face area 42. As previously stated, apertures 43 align with the holes in manifold 20. In the illustrated embodiment, head 24 includes 24 apertures 43 which align with 24 cavities in each of the two manifolds 20. Thus, by depositing 24 seeds in the first manifold and then picking up 24 more seeds and depositing them in the second manifold, the operator may fill 48 peat cups (corresponding to four rows with 12 in each row as shown in FIGS. 1 and 2). By providing additional manifolds, the number of peat cups filled may be increased to 72, 96 or any multiple of 24. Of course, a pick-up head having more or less than 24 aligned pick-up apertures may be utilized provided the manifolds have an equal number of spaced openings for receiving the seed.

An electric vacuum pump 70 is situated at the rear of the support frame and is held in place by upright member 71. Vacuum pump 70 connects to a flexible, extendible vacuum hose 65 which in turn connects to seed pick-up head 24 through a valve assembly 50. Hose 65 is supported by a hose support bracket 72 which is integrally secured to upright 26. A second flexible, extendible line 74 passes from the exhaust or pressure side of pump 70 and enters a heat exchange chamber 75 positioned immediately below seed tray 19. The exhaust from pump 70 is somewhat warmer than ambient so that a warm base surface is maintained in tray 19 when pump 70 is in operation. It has been found that the heat helps to prevent the seeds from packing and sticking together. The heated air forced through heat exchange chamber 75 is allowed to exit through a pipe 77 which emerges from the side of chamber 75. A pressurized air supply line 59 has one end terminating within pipe 77 and, as explained below, has the other end terminating within valve 50. During operation, the exhaust within pipe 77 simply flows past line 59 and exhausts to the air. However, once valve 50 is moved to its closed position, the operator can place the palm of his hand momentarily over the opening to pipe 77 and pressurized air will be forced through line 59 into valve 50, through pick-up head 24 and out apertures 43.

Figure 4:
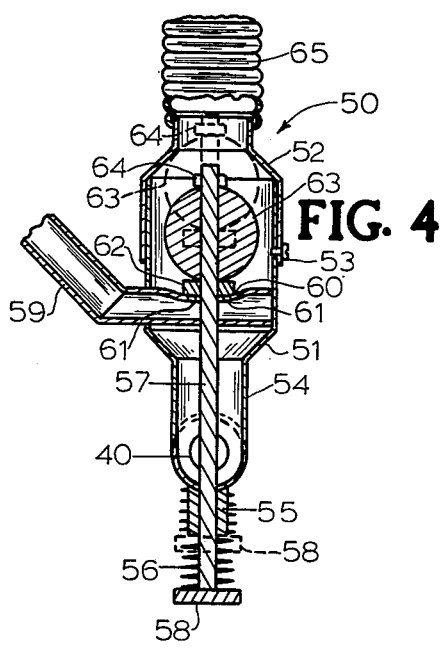
FIG. 4 is a section view taken substantially along line 4—4 of FIG. 3 disclosing the internal features of the valve with the open position shown in solid lines and the closed position in dashed lines.

Referring to FIGS. 3 and 4, valve assembly 50 includes a pair of hollow members 51, 52 with member 52 being of slightly larger diameter and capable of receiving member 51 and the two being held together by a screw 53. A T-connection 54 is integrally secured by welding to members 51 and 40, and provides an air passage from valve 50 to members 40. A boss 55 integral with T-connection 54 mounts a spring 56 which biases the valve stem 57 outwardly to the open position shown in solid lines in FIG. 4. Stem 57 has at its lower end a finger engagable plunger member 58 and at its upper end a resilient ball member 63. Ball 63 is held on stem 57 by nut 64 and is of a diameter large enough so that when stem 57 is moved inward against the bias of spring 56, ball 63 will close off the communication with vacuum base 65 by seating in the constricted upper portion of member 52 (see the dashed lines in FIG. 4). Thus, a simple vertical displacement of stem 57 moves valve 50 from an open to a closed position.

Valve 50 is also designed so that a flow of air may be directed into head 24 and out apertures 43. As best shown in FIG. 4, the previously mentioned pressurized air supply line 59 passes through and is made integral with member 51. The top area 60 of line 59 is flattened and has four holes 61 which communicate with the interior of valve 50. A seal 62 is integrally secured to shaft 57 and when valve 50 is in the open position shown in solid lines in FIG. 4, seal 62 closes off holes 61. When valve 50 is moved to the closed position, seal 62 uncovers holes 61 so that line 59 may communicate with the interior of valve 50 and with the pick-up head 24. When valve 50 is in this closed position, the operator may place the palm of his hand over the end of exhaust pipe 77 thereby forcing a flow of air through line 59 and to apertuers 43. This slight flow of air is useful to dislodge seed which may stick to the pick-up head even after the vacuum is removed. Thus, it can be seen that the apertures 43 may be placed in three pressure conditions: (1) unpressurized (neutral pressure), (2) vacuum (negative pressure), or (3) pressurized (positive pressure). Neutral pressure is achieved either when the vacuum pump 70 is off or when the valve is closed. Negative pressure is achieved when the pump 70 is energized and the valve is allowed to remain in its normally closed position. Positive pressure is achieved when pump 70 is energized, valve 50 is closed and a flow of air is forced into line 59 by the operator placing the palm of his hand over the end of pipe 77.

Figure 5:
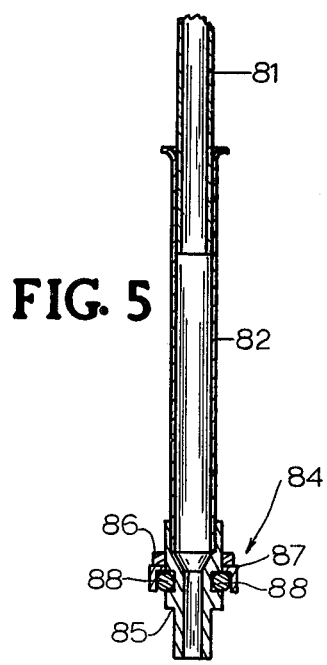
FIG. 5 is a section view taken along line 5—5 of FIG. 1 illustrating the adjustable tube positioning feature of the present invention.

Turning now to a description of the means for delivering the seeds to the peat cups, a plurality of flexible plastic lines 81 extend from the respective apertures in manifold 20 downward through their respective guide tubes 82. Guide tubes 82 are held in place by adjustable positioning supports 84. FIG. 5 illustrates one of such guide tubes 82 and its respective support 84 in larger scale. Lines 81 are slidably received within guide tubes 82 and are adjustable as to their depth within guide tube 82 depending on the distance tube 82 is positioned from manifold 20. The adjustable positioning support 84 comprises a sleeve 85, a lock nut 86, a bracket 87 and a pair of rails 88. Sleeve 85 passes between rails 88 and is slidable thereon. Bracket 87 is placed over sleeve 85 and is tightened down on rails 88 by lock nut 86. The loosening of nut 86 allows for adjustment and the positioning of support 84 over the appropriate peat cup 80. The number of holes in manifold 20 and the number of plastic tubes 81 determines the necessary number of adjustable positioning supports 84 since each tube and hole does have a support 84. As stated above, the illustrated embodiment has two manifolds with 24 lines 81 depending from each. Therefore, there are 48 lines 81 and 48 supports 84.

The description will now shift to a description of a typical seeding operation employing the seed planter 10 of the invention. A quantity of seeds to be planted are placed in tray 19 in the open area thereof. Vacuum pump 70 is energized and the operator manually moves seed pick-up head 24 by grasping the neck portion of valve 50 and pulling head 24 along on rails 25 until the head is in position over tray 19. At this point, head 24 is slid forward into tray 19 and seeds are retained against apertures 43 in view of the operator. The head 24 is then moved forward against the first manifold 20 at which time apertures 43 are in vertical alignment with the respective seed drop holes in this manifold 20. Valve 50 is now closed by the operator to remove suction from head 24 so that the seeds may drop free from the apertures 43 by action of gravity. The seeds then fall into the manifold holes through flexible lines 81, through guide tubes 82, through sleeves 85 and into the respective rows of peat cups 80 in the tray. One such operation in the embodiment illustrated fills 24 peat cups 80. The operation is repeated for each manifold being used; in the case of the illustrated embodiment, two such operations fill all 48 peat cups. Should the seeds fail to drop from apertures 43 once vacuum is removed from the pick-up head 24, the operator may momentarily place the palm of his hand over pipe 77 which causes the exhaust from pump 70 to be forced through line 59 into head 24 and out apertures 43.

In operation, it has been found that the seed planter of the present invention works extremely well with zinnia, tomato, pepper, broccoli, cabbage and pansy seeds. Petunia seeds require much smaller apertures than do most other seeds but an interchangeable head can be supplied with the device. Also, it has proven very advantageous to have the apertures positioned in the side of the seed head since the seeds are not compacted when seeds are picked up and the raking back and forth of the seed head keeps the seeds stirred and loose. It has also been found that by adjusting the amount of vacuum to the seed head, the operator is able to pick up single or multiple seeds to insure practically 100% germination of at least one seed in all seeding cups. With the flexibility of the seed pick-up head, the operator can view the apertures to determine if all apertures have seed. The novel valve assembly allows the operator to maintain either positive, negative or neutral pressure at the pick-up apertures. The convex areas upon which each pick-up aperture is formed aids in preventing the seeds from sticking to the apertures after the vacuum is removed.

With the above stated advantages and possible modifications, it is believed that no other seed planting device is available that lends itself to such wide use and wide range of flexibility.

What is claimed is:

1. In a seed planting device of the type having a pick-up head including seed pick-up apertures for picking up individual seeds from a bulk supply at one location and transferring such seeds to a second location for dispersal in a spaced array, improved air transfer apparatus for selectively providing a positive, negative or neutral pressure condition at said apertures, said apparatus comprising:
(a) a vacuum source having a suction port and an exhaust port;
(b) first tubular transfer means for connecting said suction port to the pick-up head;
(c) second tubular transfer means for connecting said exhaust port to the pick-up head; and
(d) valve means having a hollow body portion and connecting said first tubular transfer means to said pick-up head, said valve means including closure means movable within said hollow body portion from a first lower position enabling suction from said first tubular transfer means to be applied to the pick-up head to a second higher and vertically opposite position enabling such suction to be cut off from the pick-up head, means normally biasing said valve closure means to said first position, said valve means body portion having the discharge end of said second tubular transfer means terminating therein and controlled by said closure means, said discharge end being sealed off by said closure means when said valve is in said first position and being opened when said valve closure means is raised to said second position, manual closure operator means connected internally of said body portion to said valve closure means and having an operator portion slidably mounted in said body portion for vertical movement and engagable externally thereof against said biasing means to position said closure means, and manually operable exhaust control means on said second tubular transfer means for selectively connecting or disconnecting said vacuum source exhaust port to supply a flow of exhaust air at said discharge end, whereby with said vacuum source energized, said valve means when said closure means is placed in said first position provides a negative pressure condition at said apertures, when said closure means is moved to said second position provides a neutral pressure condition at said apertures and when said closure means is moved to said second position said manual exhaust control means enables said exhaust port to be operatively connected to said second tubular transfer means discharge end to provide a positive pressure condition at said apertures.

2. A seed planting device as claimed in claim 1 wherein said closure operator means includes a valve stem having at one end an enlarged resilient valve seating member comprising said closure means and enclosed by said body portion and at the other end a finger engagable member external of said body portion for moving said valve stem and mounting a spring comprising said biasing means, the interior of said hollow body portion including a first valve seat mating with said seating member, said seating member being spaced from said first valve seat in said first position and being adapted to seat against said first seat upon depression of said finger engagable member to place said seating member in said second position, said second tubular transfer means discharge end forming a second seat and said seating member being adapted to seal off said second tubular transfer means discharge end seat when in said first position and to uncover such discharge end seat when in said second position.

* * * * *

UNITED STATES PATENT OFFICE
CERTIFICATE OF CORRECTION

Patent No. 4,117,953            Dated October 3, 1978

Inventor(s) Harold Fredrick DeHart

It is certified that error appears in the above-identified patent and that said Letters Patent are hereby corrected as shown below:

Col. 1, line 37, "2,445,701" should be --2,455,701--.

Col. 1, line 42, "of tubes of" should be --of tubes a--.

Col. 3, line 28, "seed" should be --seeds--.

Col. 5, line 18, Insert --made-- after "boss 55".

Col. 5, line 27, "base" should be --hose--.

Signed and Sealed this

Nineteenth Day of December 1978

[SEAL]

Attest:

RUTH C. MASON
Attesting Officer

DONALD W. BANNER
Commissioner of Patents and Trademarks